(12) United States Patent
Lee et al.

(10) Patent No.: US 10,191,604 B2
(45) Date of Patent: Jan. 29, 2019

(54) SENSING DEVICE AND METHOD WITH FUNCTIONS OF FORCE MEASUREMENT, TOUCH CONTROL AND FINGERPRINT IDENTIFICATION

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 12 days.

(21) Appl. No.: 15/482,029

(22) Filed: Apr. 7, 2017

(65) Prior Publication Data

US 2017/0293379 A1    Oct. 12, 2017

(30) Foreign Application Priority Data

Apr. 7, 2016    (TW) .............................. 105110945 A

(51) Int. Cl.
| | |
|---|---|
| G06F 3/045 | (2006.01) |
| G06F 3/044 | (2006.01) |
| G06K 9/00 | (2006.01) |
| G06F 3/041 | (2006.01) |

(52) U.S. Cl.
CPC ............ G06F 3/044 (2013.01); G06F 3/0416 (2013.01); G06K 9/0002 (2013.01); *G06F 2203/04105* (2013.01); *G06F 2203/04106* (2013.01)

(58) Field of Classification Search
CPC ...... G06F 3/0414; G06F 3/0416; G06F 3/044; G06F 2203/04105; G06F 2203/04106
See application file for complete search history.

(56) References Cited

U.S. PATENT DOCUMENTS

| | | | |
|---|---|---|---|
| 9,292,117 B2 * | 3/2016 | Kim ........................ | G06F 3/041 |
| 10,061,460 B2 * | 8/2018 | Lee .......................... | G06F 3/044 |
| 2012/0182261 A1 * | 7/2012 | Wang ...................... | G06F 3/044 |
| | | | 345/174 |
| 2014/0152621 A1 * | 6/2014 | Okayama .............. | G06F 3/0416 |
| | | | 345/174 |

* cited by examiner

*Primary Examiner* — Vijay Shankar
(74) *Attorney, Agent, or Firm* — Muncy, Geissler, Olds & Lowe, P.C.

(57) ABSTRACT

A sensing device is provided with functions of force measurement, touch control and fingerprint identification. A first electrode layer has plural first electrodes. A switch and wire layer includes plural switch circuits, plural switch control lines and plural sensing signal lines. Each switch circuit is corresponding to an adjacent first electrode and electrically connected to the corresponding first electrode through a contact. Each switch control line includes two control wires and is electrically connected to two switch circuits. Each sensing signal line includes one sensing wire and is electrically connected to the two switch circuits. A force electrode layer has a force electrode. A compressible dielectric layer is arranged between the first electrode layer and the force electrode layer. The compressible dielectric layer is deformed when a force is applied, and restored to the original shape after the force is removed.

24 Claims, 16 Drawing Sheets

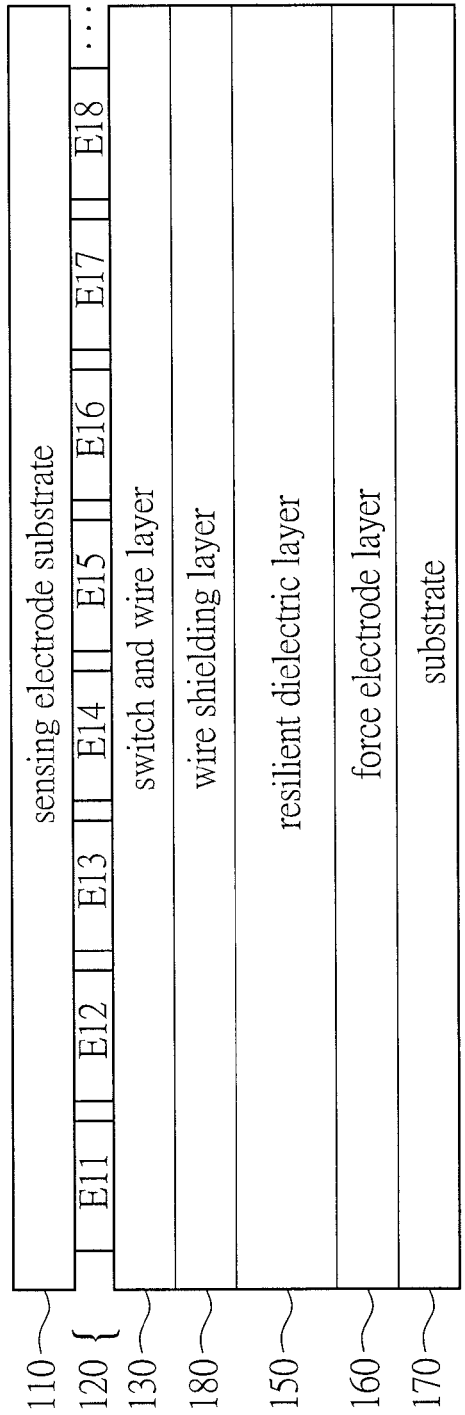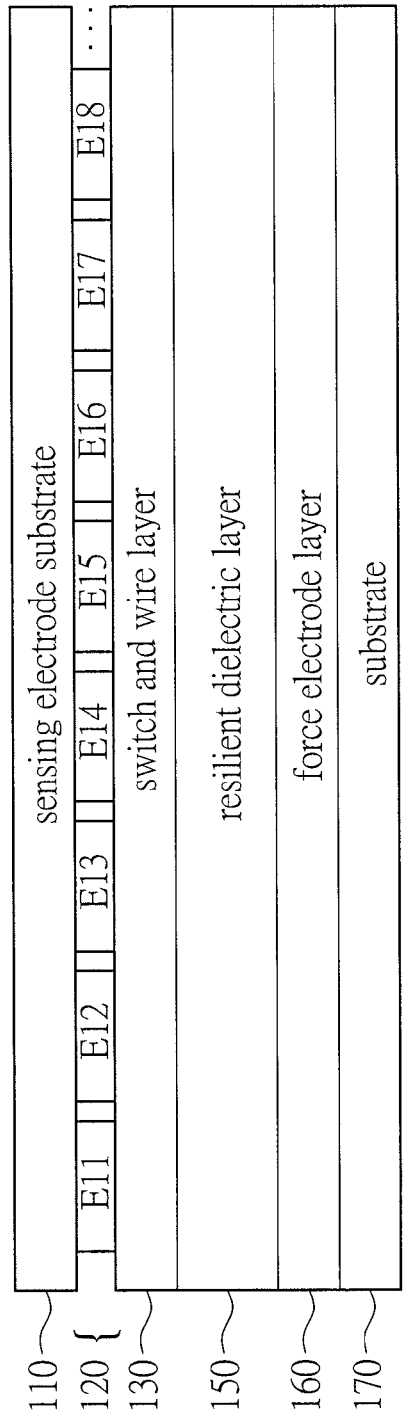
FIG. 5A
FIG. 5B

SENSING DEVICE AND METHOD WITH FUNCTIONS OF FORCE MEASUREMENT, TOUCH CONTROL AND FINGERPRINT IDENTIFICATION

BACKGROUND OF THE INVENTION

1. Field of the Invention

The present invention relates to the technical field of touch sensing and, more particularly, to a sensing device and method with functions of force measurement, touch control and fingerprint identification.

2. Description of Related Art

With the development of touch control technique, touch control operation has become an essential human machine interface for 3C products. However, the simply planar touch control is no longer satisfactory to the user. For example, the wearable device, such as smart watch, has become popular, which results in an eager requirement for the 3D force touch control. In addition, the development of electronic commerce promotes the use of remote payment, in which there is demand for biometric identification. Therefore, the integration of force touch control and biometric identification has become a major object to be developed in industry. The technology of biometric identification includes, for example, fingerprint identification, iris identification or DNA identification. Based on the considerations of efficiency, safety and non-invasiveness, the fingerprint identification becomes the primary technology in biometric identification. The fingerprint identification further includes optical type, thermal type, ultrasonic type and capacitance type, wherein the capacitance type stands out in this field by its size, cost, power saving, stability and anti-fake function.

For the typical full area capacitive fingerprint identification technique, due to that the sensing signal is very weak and the background noise is complicated and strong, the sensor electrodes and the sensing circuit are generally implemented in one IC chip with a package for protecting the conductive lines, resulting in an additional 10 µm distance between the sensor electrode and the finger, so that the sensing accuracy is negatively influenced. To reduce this distance, it needs to use an expensive sapphire film with high dielectric for protection. The aforementioned factors increase the difficulty in product integration, and thus the cost cannot be reduced and the yield, lifetime and tolerance of the products are not satisfactory.

For the prior force touch display panel, the electromechanical force sensor is generally arranged at the corner of the display panel for sensing the touch force applied to the display panel, resulting in that the sensor is expensive and also difficult to be adhered with a display panel. Moreover, a deformable resilient micro-structure manufactured by a complicated process may be provided to enhance the relation between the force and the deformation degree thereby generating a larger physical variation to facilitate sensing. Accordingly, there is a need to provide an improve device and method to integrate the force sensing, touch control and biometric identification.

SUMMARY OF THE INVENTION

The object of the present invention is to provide a sensing device and method with functions of force measurement, touch control and fingerprint identification, in which a plurality of switch circuits, a plurality of switch control lines, a plurality of sensing signal lines, a capacitance detection and switch array control circuit, and a switch control signal generating circuit are provided, and each of the first electrodes alone can be used for detecting a capacitance variation caused by the fingerprint, or some of the first electrodes can be electrically connected together to form a larger touch control electrode for touch sensing operation. Besides, by measuring the capacitance variation between the force sensing electrode and the touch electrode, the force can be calculated. In the present invention, when a capacitance detection stimulation signal is applied to a target electrode, an in-phase reflection signal is applied to the electrodes surrounding said electrode, so that electric flux lines of the electrode can be clustered and extended, thereby improving the sensing sensitivity, the sensing distance, the signal to noise ratio, and the stability and accuracy of sensing signal.

According to one aspect of the present invention, there is provided a sensing device with functions of force measurement, touch control and fingerprint identification, which comprises: a sensing electrode substrate; a first electrode layer arranged at one side of the sensing electrode substrate and including a plurality of first electrodes arranged along a first direction and a second direction, wherein the first direction is perpendicular to the second direction; a switch and wire layer including: a plurality of switch circuits, each switch circuit including at least three switches, each switch circuit corresponding to an adjacent first electrode and having a contact electrically connected to the corresponding first electrode; a plurality of switch control lines, each switch control line including at least two control wires and being electrically connected to at least two switch circuits; and a plurality of sensing signal lines, each sensing signal line including at least a sensing wire and being electrically connected to at least two switch circuits; a force electrode layer arranged at one side of the first electrode layer opposite to the sensing electrode substrate, and including at least one force electrode; and an resilient dielectric layer arranged between the first electrode layer and the force electrode layer, wherein the resilient dielectric layer is deformed when a force is applied thereto, and is restored to its original volume and shape when the force is removed therefrom.

According to another aspect of the invention, there is provided a sensing method for a sensing device with functions of force measurement, touch control and fingerprint identification, the sensing device comprising: a sensing electrode substrate; a first electrode layer including a plurality of first electrodes; a switch and wire layer including: a plurality of switch circuits, each switch circuit corresponding to an adjacent first electrode; a plurality of switch control lines, each switch control line being electrically connected to at least two switch circuits; and a plurality of sensing signal lines, each sensing signal line being electrically connected to at least two switch circuits; a force electrode layer including at least one force electrode; an resilient dielectric layer arranged between the first electrode layer and the force electrode layer; and a capacitance detection and switch array control circuit for directly or indirectly generating a switch control signal applied to the plurality of switch control lines, so as to determine which sensing wire is connected to the first electrodes. The sensing method comprises the steps of: executing a biometric identification timing, in which the capacitance detection and switch array control circuit controls the plurality of switch circuits to sequentially or randomly apply a capacitance detection stimulation signal to a selected first electrode, and receives a biometric sensing signal from the selected first electrode, so as to execute a biometric identification operation; executing a touch control detection timing, in which the capacitance detection and switch array control circuit controls the plurality of switch circuits to configure the plurality of first electrodes into a plurality of touch control electrodes, and sequentially or randomly applies a capacitance detection stimulation signal to a selected touch control electrode, and receives a touch control sensing signal from the selected touch control electrode, so as to execute a touch control sensing operation, wherein each of the touch control electrodes includes at least fifty first electrodes; and executing a force detection timing, in which the capacitance detection and switch array control circuit applies a capacitance detection stimulation signal to at least one of the force electrodes, and receives a force sensing signal from the force electrode, so as to execute a force detection operation.

BRIEF DESCRIPTION OF THE DRAWINGS

FIG. 5A is another stack-up diagram of the sensing device with functions of force measurement, touch control and fingerprint identification according to the present invention;

FIG. 5B is still another stack-up diagram of the sensing device with functions of force measurement, touch control and fingerprint identification according to the invention;

DETAILED DESCRIPTION OF THE PREFERRED EMBODIMENT

Figure 1:
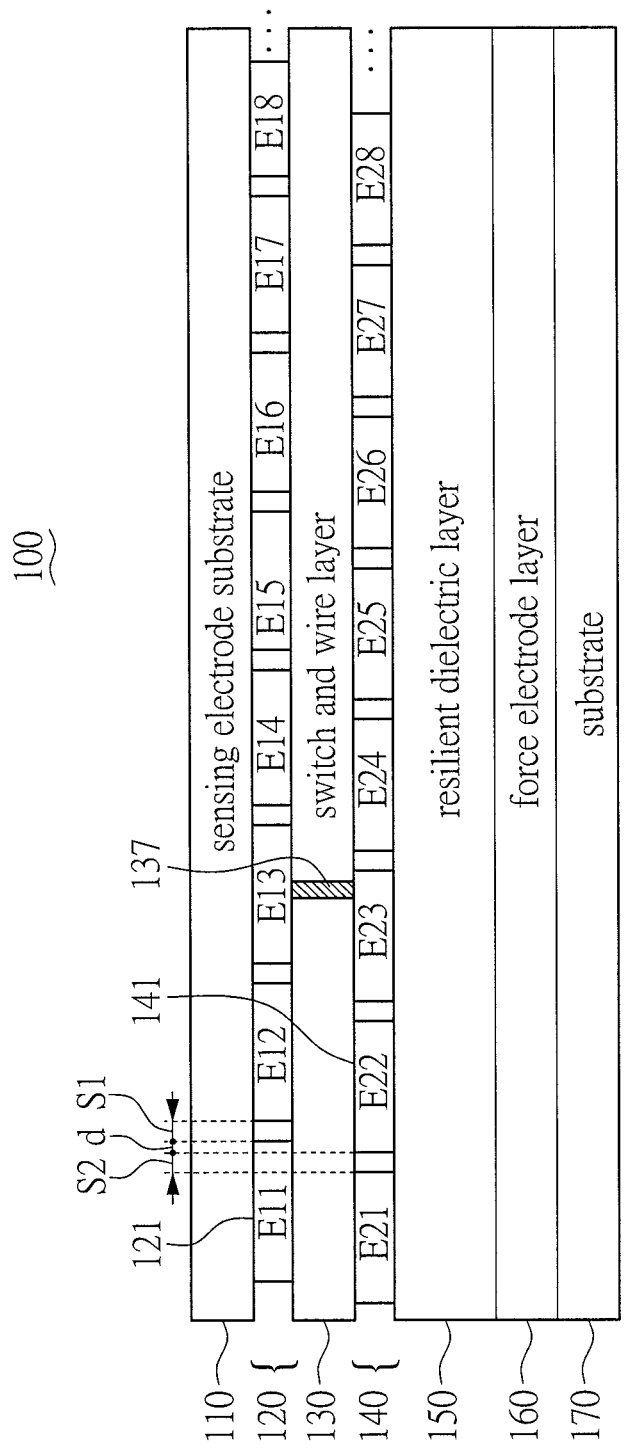
FIG. 1 is a stack-up diagram of a sensing device with functions of force measurement, touch control and fingerprint identification according to the present invention.

FIG. 1 is a stack-up diagram of a sensing device with functions of force measurement, touch control and fingerprint identification according to the present invention. As shown in FIG. 1, the sensing device 100 includes a sensing electrode substrate 110, a first electrode layer 120, a switch and wire layer 130, a second electrode layer 140, a resilient dielectric layer 150, a force electrode layer 160 and a substrate 170.

Figure 2:
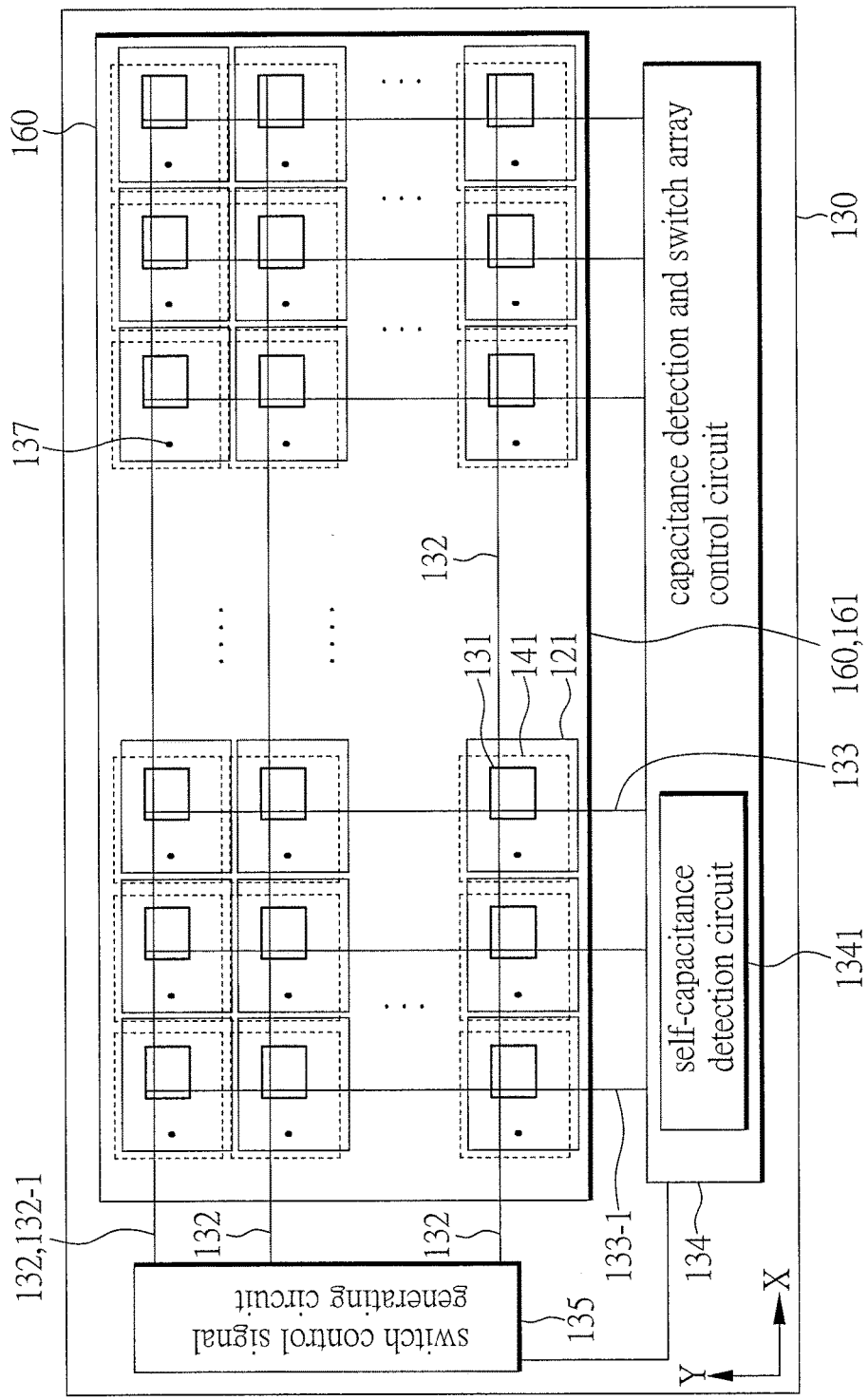
FIG. 2 is a structure diagram of the sensing device with functions of force measurement, touch control and fingerprint identification according to the present invention.

FIG. 2 is a structure diagram of the sensing device with functions of force measurement, touch control and fingerprint identification according to the present invention. As shown, the first electrode layer 120 is arranged at one side of the sensing electrode substrate 110 and includes a plurality of first electrodes 121 arranged along a first direction (X-axis direction) and a second direction (Y-axis direction), where the first direction is perpendicular to the second direction.

Figure 3:
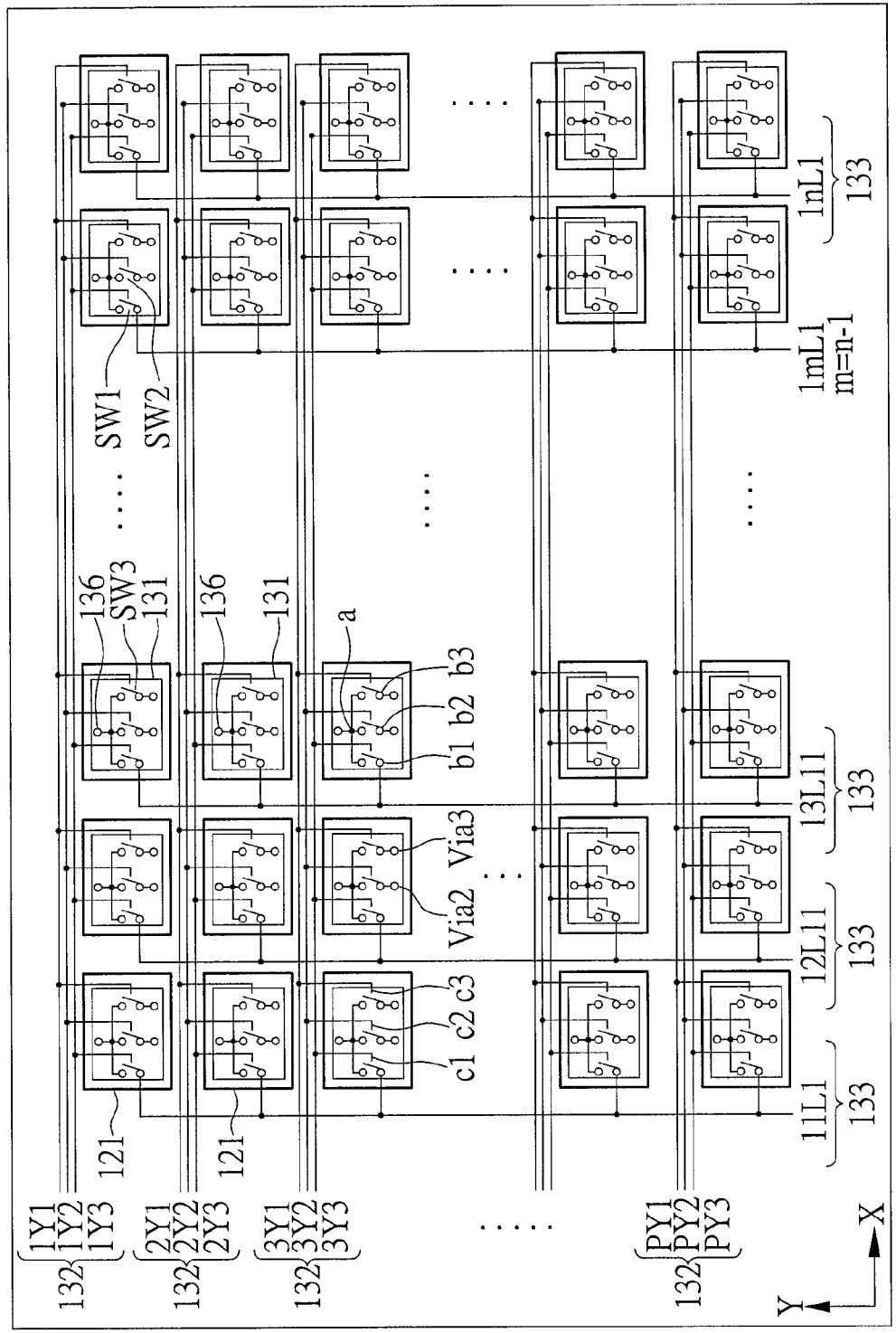
FIG. 3 is a schematic diagram illustrating the switch and wire layer and the first electrodes according to the present invention.

The switch and wire layer 130 includes a plurality of switch circuits 131, a plurality of sensing signal lines 133, a capacitance detection and switch array control circuit 134 and a switch control signal generating circuit 135. In other embodiments, the switch control signal generating circuit can be involved in the capacitance detection and switch array control circuit 134, and the capacitance detection and switch array control circuit 134 directly generates a related switch control signal applied to the switch control lines 132. Each of the switch circuits 131 includes at least three switches. Each switch circuit 131 is corresponding to an adjacent first electrode 121, and has a contact 136 electrically connected to the corresponding first electrode 121, as shown in FIG. 3.

Each of the switch control lines 132 includes at least two control wires and is electrically connected to at least two switch circuits 131. As shown in FIG. 2, a switch control line 132-1 is electrically connected to the switch circuits 131 on the first row, and similar connections are applied for the other rows so that a detailed description is deemed unnecessary. In FIG. 2, each switch control line 132 controls each switch circuit 131 connected thereto for determining that each of the corresponding first electrodes 121 is connected to which one of the sensing wires.

Each sensing signal line 133 includes at least a sensing wire and is electrically connected to at least two switch circuits 131. As shown in FIG. 2, a sensing signal line 133-1 is electrically connected to all switch circuits 131 on the first column, and similar connections are applied for the other columns so that a detailed description is deemed unnecessary.

The capacitance detection and switch array control circuit 134 directly or indirectly generates a switch control signal for being applied to the plurality of switch control lines 132, so as to configure that each of the first electrodes 121 is connected to which one of the sensing wires. The capacitance detection and switch array control circuit 134 also generates a capacitance detection stimulation signal, an in-phase reflection signal and a capacitance stimulation counter signal for being respectively applied to the sensing wires, and receives a sensing signal from a portion of the sensing wires.

The switch control signal generating circuit 135 generates the switch control signals according to the capacitance detection and switch array control circuit 134. The switch control signal generating circuit 135 can be a plurality of registers, or a plurality of shift registers. That is, the capacitance detection and switch array control circuit 134 generates the switch control signals through the registers or the shift register circuits disposed on the switch and wire layer 130. In other embodiments, the capacitance detection and switch array control circuit 134 and the switch control signal generating circuit 135 can be disposed on the sensing electrode substrate. That is, the capacitance detection and switch array control circuit 134 generates the switch control signals through the registers or the shift register circuits disposed on the sensing electrode substrate.

The capacitance detection and switch array control circuit 134 further includes at least a self-capacitance detection circuit 1341. The self-capacitance detection circuit 1341 receives the sensing signal to determine the capacitance variation of the corresponding electrode. According to the capacitance variation of the electrode, it is able to proceed with the force measurement, the touch control measurement and the fingerprint measurement.

FIG. 3 is a schematic diagram illustrating the switch and wire layer and the first electrodes according to the present invention. In FIG. 3, the switches of the plurality of the switch circuits 131 are TFT (thin-film transistor) or COMS circuits. Each switch circuit 131 includes at least three switches SW1, SW2, SW3. Each switch circuit 131 has a first terminal (a), N second terminals (b), and m control terminals (c). The m control terminals (c) are used to control the connections between the first terminal (a) and the N terminals (b), where m and N are each an integer greater than one. In this embodiment, the switch circuit 131 is a one-to-three switch circuit, and thus it has a first terminal (a), three second terminals (b1, b2, b3), and three control terminals (c1, c2, c3).

As shown in FIG. 3, there is a corresponding one-to-three switch circuit 131 disposed at a location adjacent to each first electrode 121. The i-th second terminals of the one-to-three circuits 131 corresponding to the first electrodes 121 on each column are electrically connected to each other, and one of the N second terminals is electrically connected to its corresponding first electrode 121, where 1≤i≤N. That is, the 1-st second terminals (b1) of the one-to-three switch-circuits 131 on the same column are electrically connected to each other, the 2-nd second terminals (b2) of the one-to-three switch circuits 131 on the same column are electrically connected to each other, the 3-rd second terminals (b3) of the one-to-three switch circuits 131 on the same column are electrically connected to each other, and so on.

The first electrodes 121 of each column are corresponding to at least one sensing signal line 133. In this embodiment, the first electrodes 121 of each column are corresponding to a sensing wire. For example, the first electrodes 121 of the first column are corresponding to a sensing wire 11L1, the first electrodes 121 of the second column are corresponding to a sensing wire 12L1, the first electrodes 121 of the third column are corresponding to a sensing wire 13L1, . . . , and the first electrodes 121 of the n-th column are corresponding to a sensing wire 1nL1. Each sensing signal line 133 is electrically connected to one of the N second terminals of the one-to-three switch circuits 131 corresponding to the first electrodes of the column. For example, the sensing wire 11L1 is electrically connected to the 1-st second terminals (b1) of all one-to-three switch circuits 131 corresponding to the first electrodes 121 of the first column. In other embodiments, the 2-nd second terminals (b2) of all one-to-three switch circuits 131 can be electrically connected to other electrical signals, such as a first common voltage node, through a via (via2). Similarly, the 3-rd second terminals (b3) of all one-to-three switch circuits 131 can be electrically connected to other electrical signals, such as a second common voltage node, through a via (via3).

Figure 4:
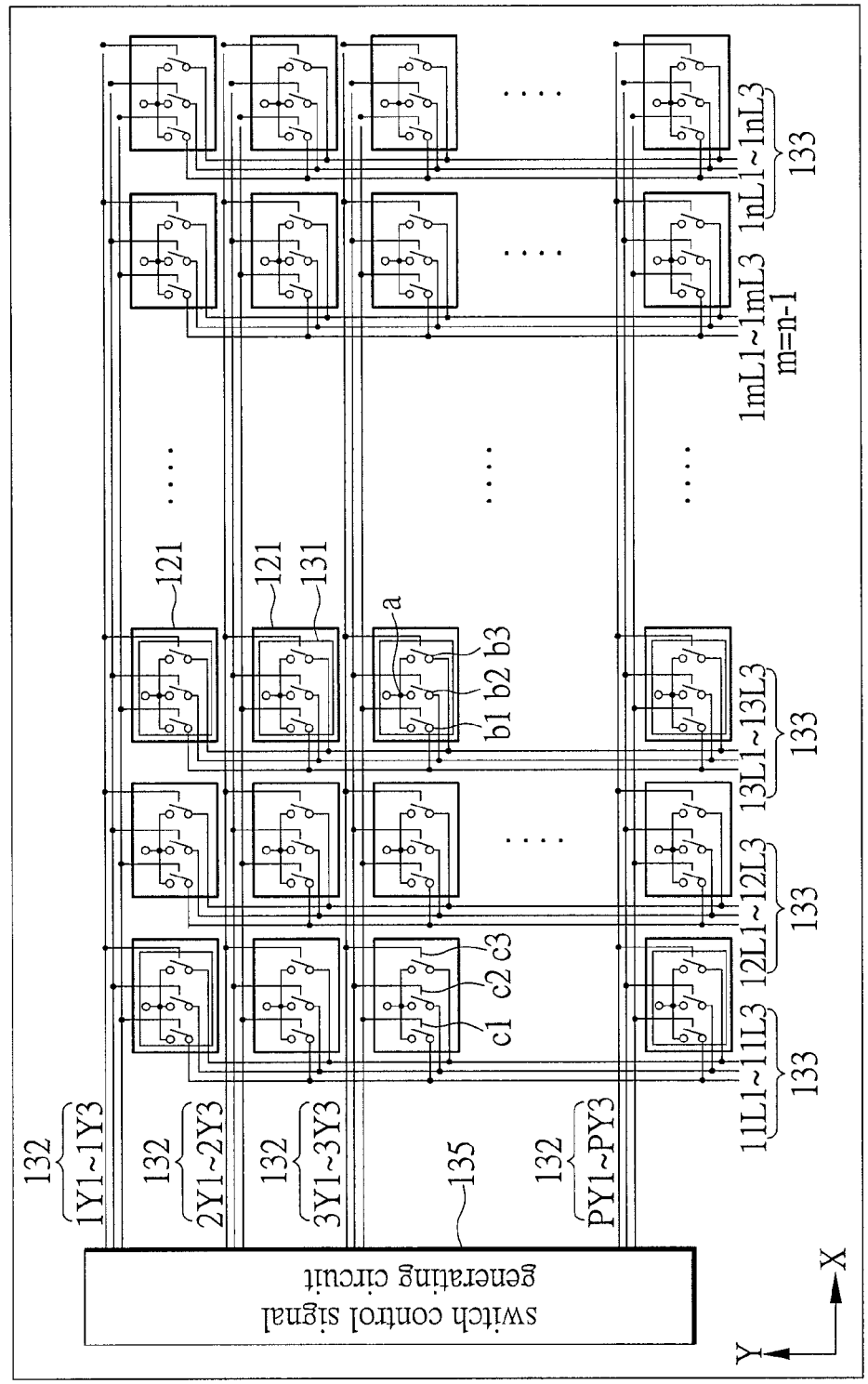
FIG. 4 is another schematic diagram illustrating the switch and wire layer and the first electrodes according to the present invention.

FIG. 4 is another schematic diagram illustrating the switch and wire layer and the first electrodes according to the present invention, which is similar to FIG. 3 except that there are three sensing signal lines 133 in FIG. 4. For example, the first electrodes 121 on the first column are corresponding to three sensing wires 11L1 to 11L3, the first electrodes 121 on the second column are corresponding to three sensing wires 12L1 to 12L3, the first electrodes 121 on the third column are corresponding to three sensing wires 13L1 to 13L3, . . . , and the first electrodes 121 on the n-th column are corresponding to three sensing wires 1nL1 to 1nL3. Each sensing signal line 133 is electrically connected to one of the N-th second terminals of the one-to-three switch circuits 131 corresponding to the first electrodes 121 of the column. For example, the sensing wire 11L1 is electrically connected to the 1-st second terminals (b1) of all one-to-three switch circuits 131 corresponding to the first electrodes 121 on the first column, the sensing wire 11L2 is electrically connected to the 2-nd second terminals (b2) of all one-to-three switch circuits 131 corresponding to the first electrodes 121 on the first column, the sensing wire 11L3 is electrically connected to the 3-rd second terminals (b3) of all one-to-three switch circuits 131 corresponding to the first electrodes 121 on the first column, . . . , and the sensing wire 11LN is electrically connected to the N-th second terminals (bN) of all one-to-three switch circuits 131 corresponding to the first electrodes 121 on the first column.

The first electrodes 121 of each row are corresponding to m switch control lines 132. In this embodiment, the first electrodes 121 of each row are corresponding to three control wires. For example, the first electrodes 121 of the first row are corresponding to three control wires 1Y1 to 1Y3, . . . , and the first electrodes 121 of the P-th row are corresponding to three control wires PY1 to PY3. Each switch control line 132 is electrically connected to one of the m control terminals of the one-to-three switch circuits 131 corresponding to the first electrodes 121 of the row. For example, the control wires 1Y1 is electrically connected to the first control terminals (c1) of all one-to-three switch circuits 131 corresponding to the first electrodes 121 of the first row, the control wire 1Y2 is electrically connected to the second control terminals (c2) of all one-to-three switch circuits 131 corresponding to the first electrodes 121 of the first row, and the control wire 1Y3 is electrically connected to the third control terminals (c3) of all one-to-three switch circuits 131 corresponding to the first electrodes 121 of the first row. The control wire PY1 is electrically connected to the first control terminals (c1) of all one-to-three switch circuits 131 corresponding to the first electrodes 121 of the P-th row, the control wire PY2 is electrically connected to the second control terminals (c2) of all one-to-three switch circuits 131 corresponding to the first electrodes 121 of the P-th row, and the control wire PY3 is electrically connected to the third control terminals (c3) of all one-to-three switch circuits 131 corresponding to the first electrodes 121 of the P-th row.

In this embodiment, the relationship between the switch control lines 132 and the switch circuits 131 is a one-hot encoding. That is, when the switch circuits 131 are one-to-three switch circuits, and each one-to-three switch circuit 131 has m (=3) control terminals, the number of the control wires corresponding to the one-to-three switch control circuits 131 of the same row is three.

Based on the plurality of switch circuits 131, the plurality of switch control lines 132, the plurality of sensing signal lines 133, the capacitance detection and switch array control circuit 134, and the switch control signal generating circuit 135, the present invention can utilize one of the plurality of first electrodes 121 alone, or can electrically connect a portion of the first electrodes 121 to form a larger electrode.

The force electrode layer 160 is arranged at one side of the first electrode layer 120 opposite to the sensing electrode substrate 110 and includes at least one force sensing electrode 161. The resilient dielectric layer 150 is arranged between the first electrode layer 120 and the force electrode layer 160. The resilient dielectric layer 150 is deformed when a force is applied thereto, and is restored to its original volume and shape when the force is removed therefrom.

The second electrode layer 140 is arranged between the switch and wire layer 130 and the resilient dielectric layer 150. The second electrode layer 140 includes a plurality of second electrodes 141. Each second electrode 141 is corresponding to and electrically connected to one of the first electrodes 121. As shown in FIG. 1, each second electrode 141 is electrically connected to the corresponding first electrode 121 through a via 137.

As shown in FIG. 1, a space S1 between the first electrode E11 and the first electrode E12 is interlaced with a space S2 between the second electrode E21 and the second electrode E22. That is, there is a distance (d) between the space S1 and the space S2, so as to prevent the force sensing electrodes 161 of the force electrode layer 160 from being influenced by the electric flux lines generated by the finger of a user. That is, when proceeding with a force sensing, the first electrodes and the second electrodes serve as an excellent shielding to the force sensing electrodes 161, and thus the touch control signals will not influence the force sensing operation.

The substrate 170 is arranged at one side of the resilient dielectric layer 150 opposite to the first electrode layer, wherein the substrate 170 is a protection glass or a protection film of a display device. In other embodiments, the substrate 170 is a color filter substrate of a display device, and the force electrode layer can be a shielding protection layer of a display device.

FIG. 5A is another stack-up diagram of the sensing device with functions of force measurement, touch control and fingerprint identification according to the present invention, which is similar to FIG. 1 except that the second electrode layer 140 is replaced by a wire shielding layer 180 in FIG. 5A. FIG. 5B is still another stack-up diagram of the sensing device with functions of force measurement according to the invention, which is similar to FIG. 5A except that the wire shielding layer 180 is removed in FIG. 5B.

Figure 6A:
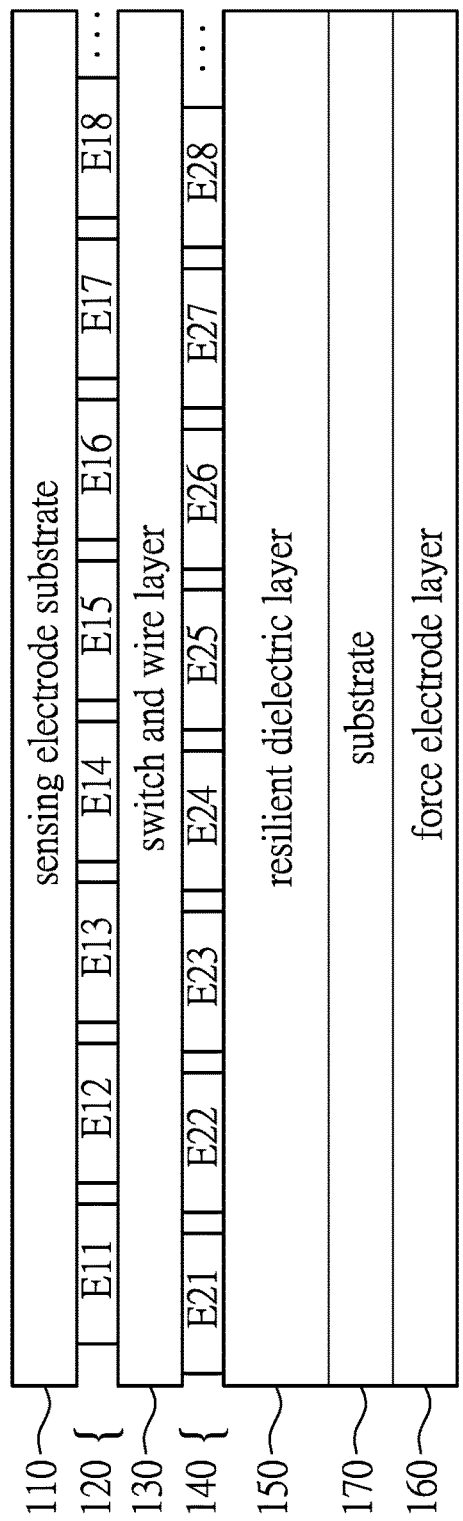
FIG. 6A is yet another stack-up diagram of the sensing device with functions of force measurement, touch control and fingerprint identification according to the present invention.
Figure 6B:
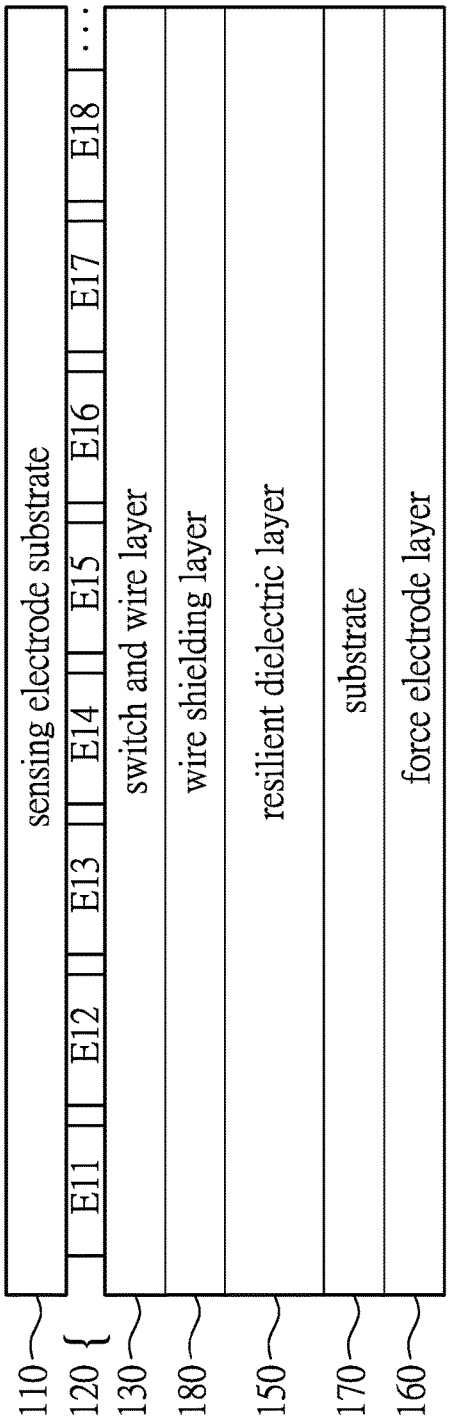
FIG. 6B is further another stack-up diagram of the sensing device with functions of force measurement, touch control and fingerprint identification according to the invention.
Figure 6C:
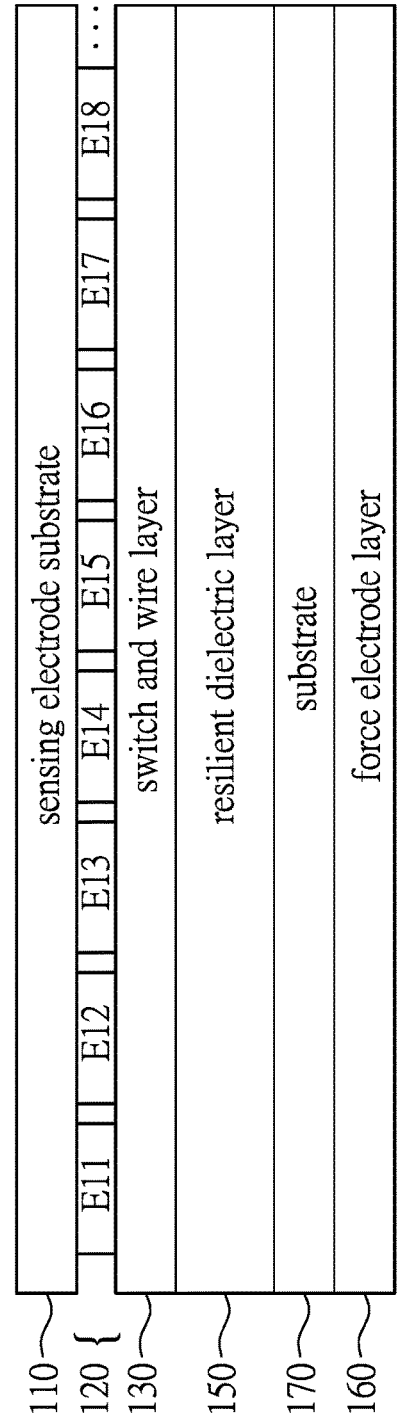
FIG. 6C is still further another stack-up diagram of the sensing device with functions of force measurement, touch control and fingerprint identification according to the invention.

FIG. 6A is yet another stack-up diagram of the sensing device with functions of force measurement, touch control and fingerprint identification according to the present invention, which is similar to FIG. 1 except that the locations of the force electrode layer 160 and the substrate 170 are exchanged in FIG. 6A. FIG. 6B is further another stack-up diagram of the sensing device with functions of force measurement, touch control and fingerprint identification according to the present invention, which is similar to FIG. 6A except that the second electrode layer 140 is replaced by a wire shielding layer 180 in FIG. 6B. FIG. 6C is still further another stack-up diagram of the sensing device with functions of force measurement, touch control and fingerprint identification according to the present invention, which is similar to FIG. 6B except that the shielding layer 180 is removed. Those skilled in the art can understand the aforementioned different embodiments of the sensing device with functions of force measurement, touch control and fingerprint identification based on FIG. 1, and thus a detailed description therefor is deemed unnecessary.

Figure 7:
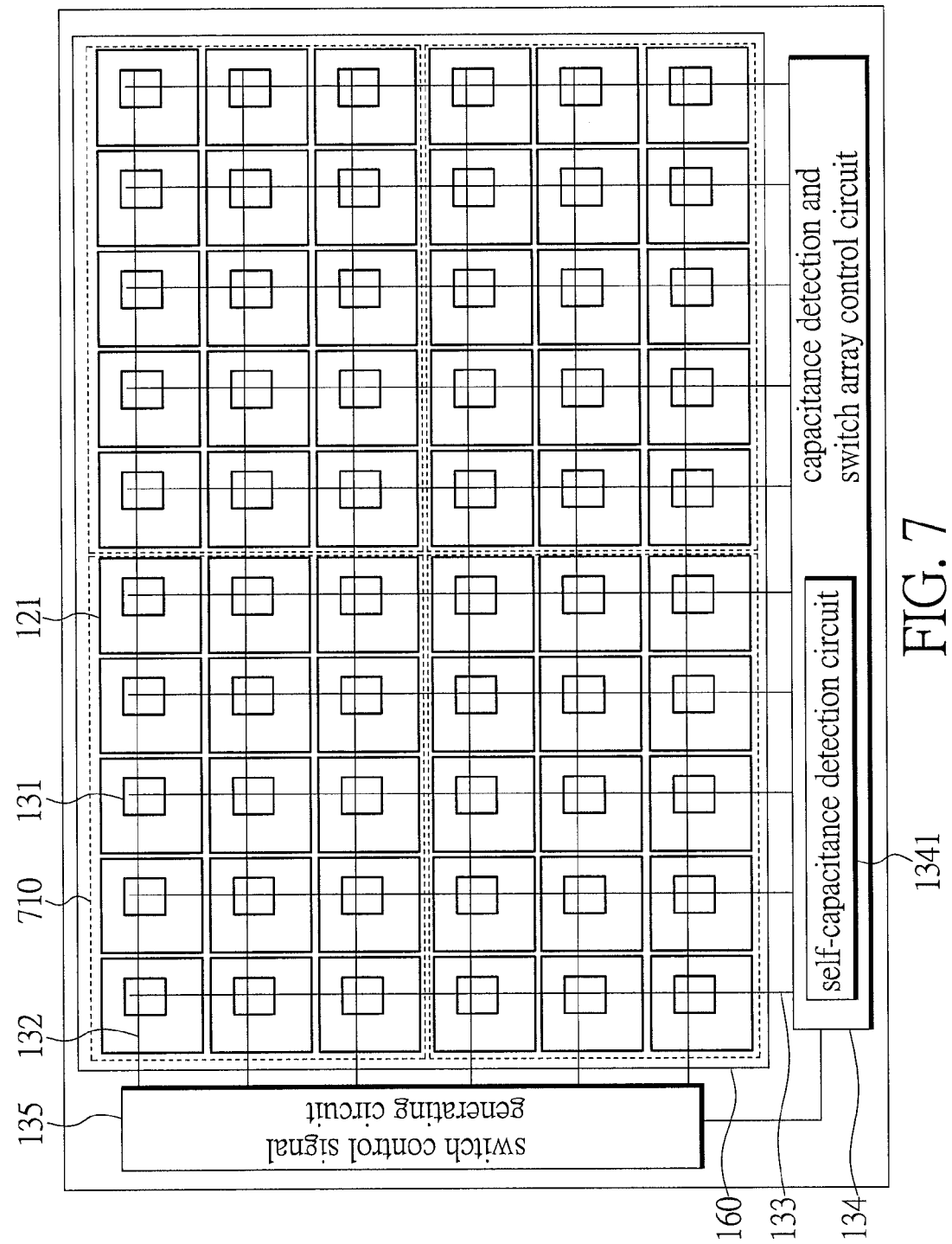
FIG. 7 is a schematic diagram illustrating the operation of the present invention.

FIG. 7 is a schematic diagram illustrating the operation of the present invention, wherein the size of a first electrode 121 is substantially equal to that of a second electrode 141, and the length or width of the first electrode 121 is about 50 μm to 100 μm. When proceeding with the fingerprint identification, with the plurality of switch circuits 131, the plurality of switch control lines 132, the plurality of sensing signal lines 133, the capacitance detection and switch array control circuit 134, and the switch control signal generating circuit 135, the present invention can utilize one of the plurality of first electrodes 121 alone to sense a capacitance variation caused by fingerprint. In general, the effective width of a ridge of fingerprint is about 200 μm to 300 μm. Thus, the length and width of the first electrode 121 (about 50 μm to 100 μm) are just suitable for proceeding with the fingerprint identification.

When proceeding with the touch sensing operation, with the plurality of switch circuits 131, the plurality of switch control lines 132, the plurality of sensing signal lines 133, the capacitance detection and switch array control circuit 134, and the switch control signal generating circuit 135, the present invention can electrically connect a portion of the first electrodes 121 to form a larger touch control electrode 710. For example, if the size of a tip of a stylus is about 1 mm, and the length or width of the first electrode 121 is about 50 μm, the tip of the stylus preferably crosses two touch control electrodes 710, so that the touch control sensing signal can be provided with a better linearity. Thus, the width of one touch control electrode 710 is about 500 μm, which may include ten first electrodes 121 (500 μm/50 μm=10). That is, one touch control electrode 710 is composed by about 100 first electrodes. In the example of FIG. 7, one touch control electrode 710 is composed by about 15 (=3×5) first electrodes 121.

Figure 8:
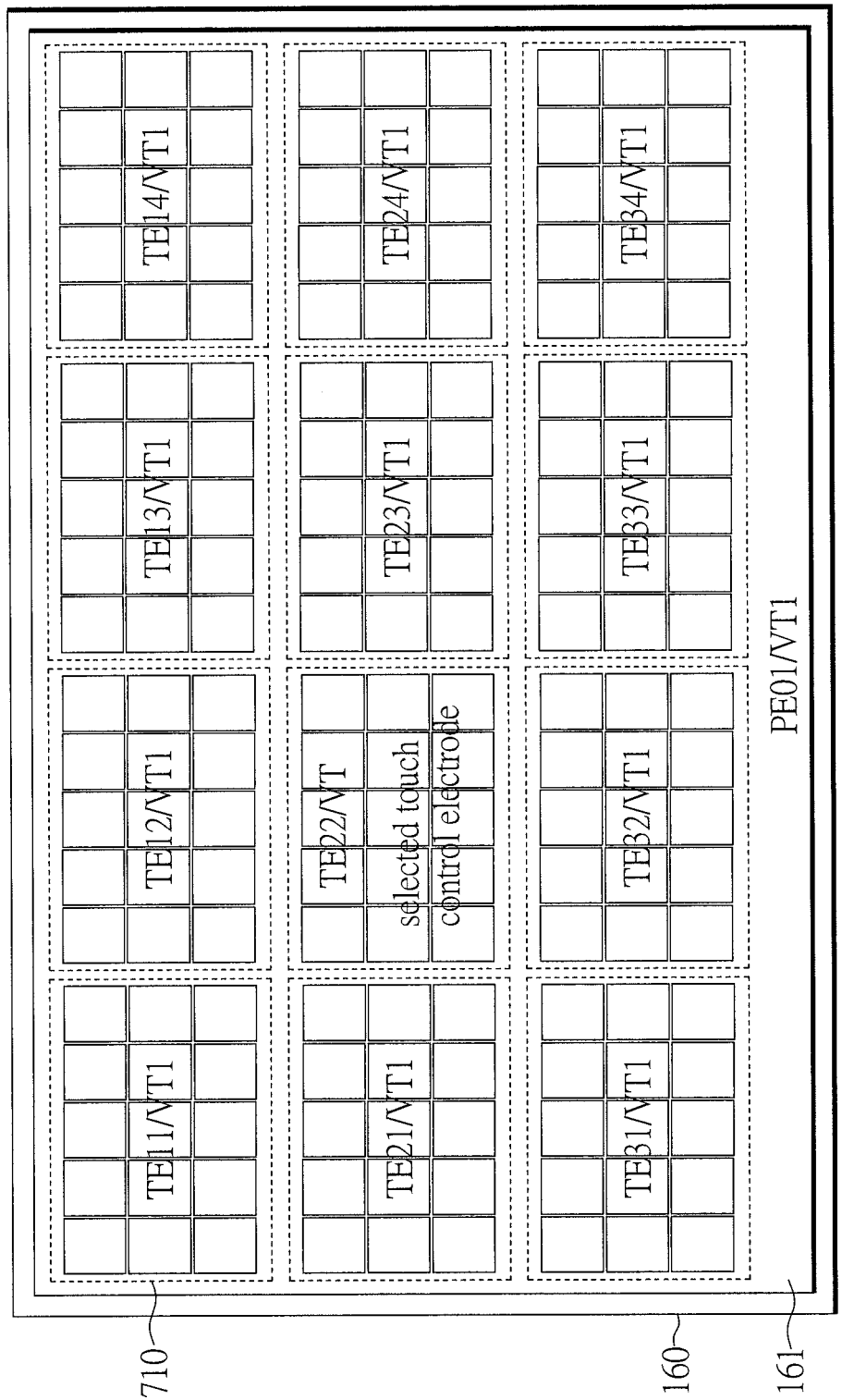
FIG. 8 is a schematic diagram illustrating a touch sensing being performed according to the present invention.

FIG. 8 is a schematic diagram illustrating a touch sensing being performed according to the present invention. As shown in FIG. 8, TE represents the touch control electrodes 710, PE represents the force sensing electrodes 161, VT represents a capacitance detection stimulation signal, and VT1 represents an in-phase reflection signal. VT1 is in-phase with VT, and the amplitude of VT1 can be the same as that of VT. As shown in FIG. 8, when the touch control electrode TE22 is selected as a target touch control electrode, a capacitance detection stimulation signal VT is applied to the touch control electrode TE22, and an in-phase reflection signal VT1 is applied to other touch control electrodes surrounding the electrode TE22, while an in-phase reflection signal VT1 is applied to the force sensing electrode PE01. Due to the force sensing electrode PE01 and the touch control electrode TE22 are overlapped vertically, when the force sensing electrode PE01 and the touch control electrode TE22 have the same voltage level, the capacitance effect between the force sensing electrode PE01 and the touch control electrode TE22 can be eliminated, so that the force will not influence the touch sensing operation. That is, when there is a touch, a deformation caused by force results in that the distance between the force sensing electrode PE01 and the touch control electrode TE22 is decreased, and the capacitance between the force sensing electrode PE01 and the touch control electrode TE22 is increased. However, in the present invention, due to the force sensing electrode PE01 and the touch control electrode TE22 having the same voltage level, there is no capacitance effect between the force sensing electrode PE01 and the touch control electrode TE22. Accordingly, although the distance between the force sensing electrode PE01 and the touch control electrode TE22 is decreased due to the deformation, there is still no capacitance effect between the force sensing electrode PE01 and the touch control electrode TE22, so that the deformation caused by force will not influence the touch sensing operation.

Furthermore, other touch control electrodes surrounding the selected touch control electrode TE22 on the same plane have the same voltage level with the selected touch control electrode TE22, which allows the electric flux lines of the selected touch control electrode TE22 to be further extended, thereby effectively proceeding with the touch sensing operation. In other embodiments, the amplitude of VT1 is different from that of VT.

Figure 9:
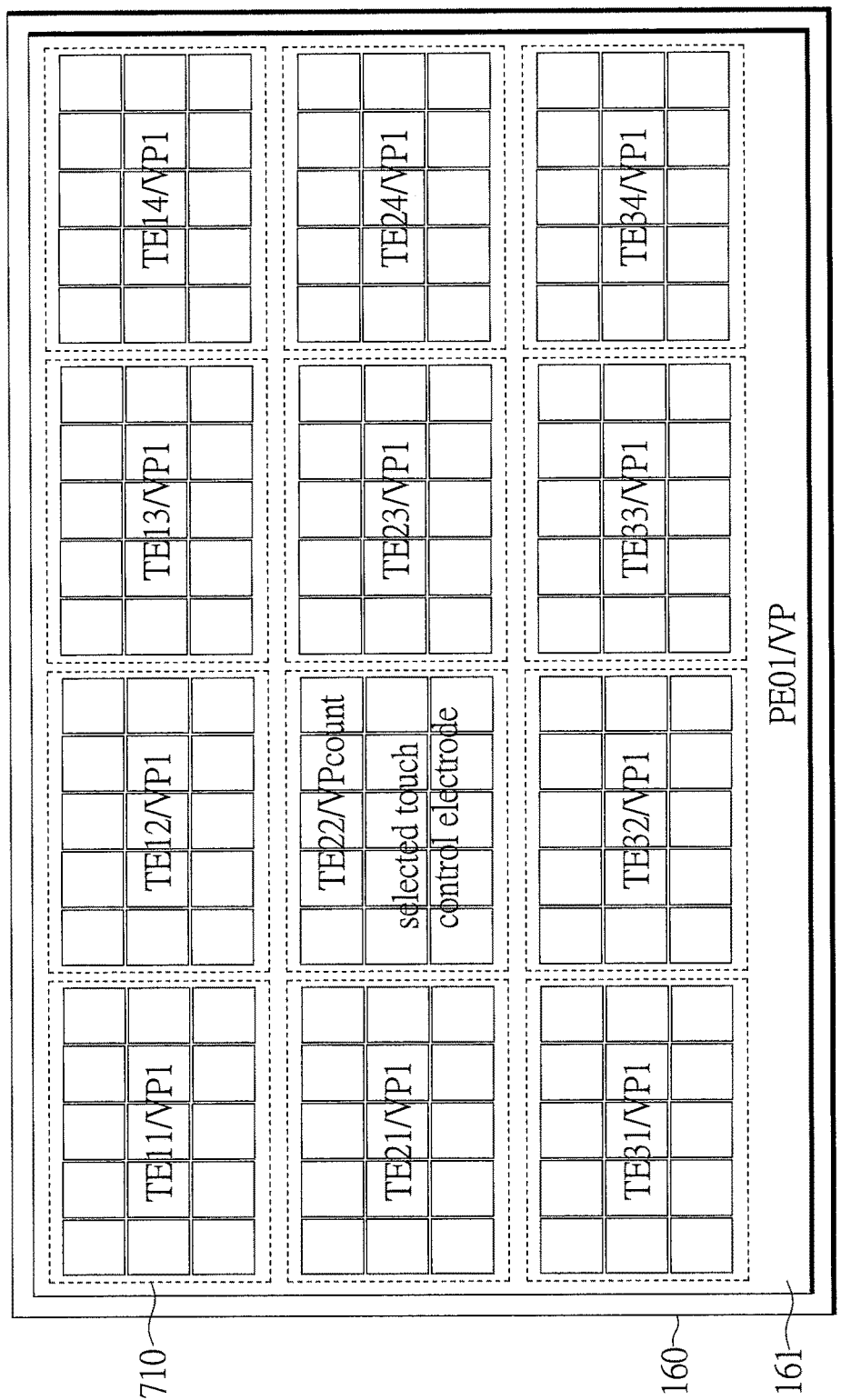
FIG. 9 is a schematic diagram illustrating a force detection being performed according to the present invention.

FIG. 9 is a schematic diagram illustrating a force detection being performed according to the present invention. As shown in FIG. 9, VP represents a capacitance detection stimulation signal, VP1 represents an in-phase reflection signal, and VPcount represents a capacitance stimulation counter signal. VP1 is in-phase with VP, and the amplitudes of VP1 is the same as that of VP. VPcount can be a DC reference signal, or 0V. VPcount can be out of phase to VP, and the amplitude of VPcount may be the same as or different from that of VP. Thus, because the force sensing electrode PE01 and the touch control electrode TE22 are overlapped vertically, there is a capacitance formed between the force sensing electrode PE01 and the touch control electrode TE22. When a finger or a stylus applies force to the touch control electrode TE22, the distance between the force sensing electrode PE01 and the touch control electrode TE22 is decreased due to the force, and the capacitance between the force sensing electrode PE01 and the touch control electrode TE22 is increased. Thus, the value of the force can be calculated by measuring the capacitance variation between the force sensing electrode PE01 and the touch control electrode TE22.

When VPcount is out of phase to VP and has the same amplitude with VP, especially when VPcount is in opposite phase of VP, the capacitance formed between the force sensing electrode PE01 and the touch control electrode TE22 is greater than that when VP is DC reference signal. Due to that there is a ratio between the amount of capacitance variation formed by the force and the capacitance formed between the force sensing electrode PE01 and the touch control electrode TE22, there is a relatively large amount of capacitance variation generated when Vpcount is out of phase to VP and has the same amplitude with VP, which can improve the measurement of the capacitance variation, so that the calculated force value is more accurate.

When the finger or stylus applies force to other locations, the change of distance between the force sensing electrode PE01 and the touch control electrode TE22 is relatively small, so that the capacitance variation between the force sensing electrode PE01 and the touch control electrode TE22 is also relatively small. Thus, when the capacitance variation between the force sensing electrode PE01 and the touch control electrode TE22 is lower than a threshold, there is no need to calculate the force, because it means that the finger or stylus applies force to other locations.

Figure 10:
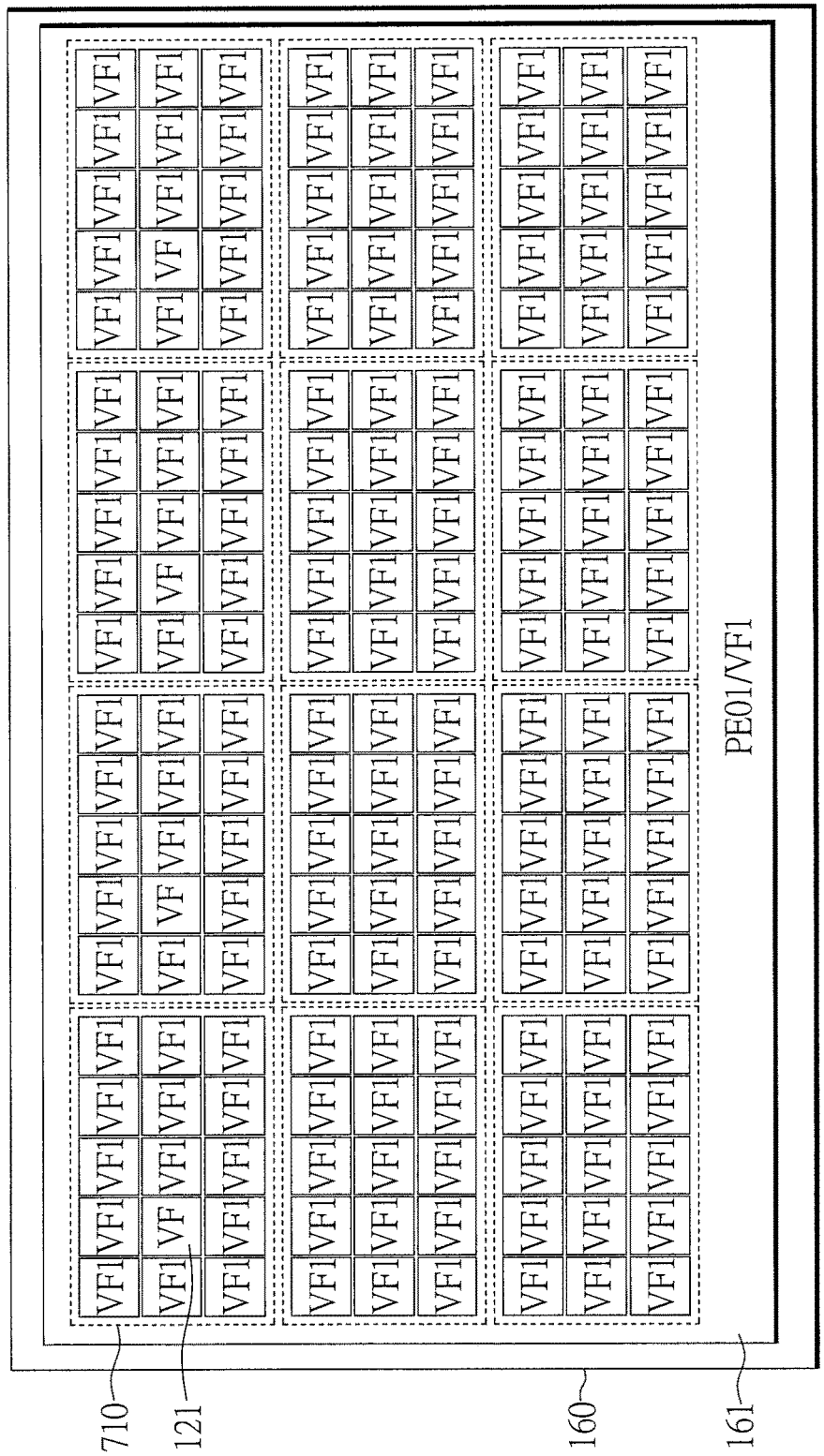
FIG. 10 is a schematic diagram illustrating a fingerprint identification being performed according to the present invention.

FIG. 10 is a schematic diagram illustrating a fingerprint identification being performed according to the present invention. As shown in FIG. 10, when the fingerprint identification is performed, the first electrodes 121 alone can be used to perform related capacitance detection. When a first electrode 121 alone is used to perform the capacitance detection, the first electrode 121 is applied with a capacitance detection stimulation signal VF, the first electrodes surrounding said first electrode 121 are applied with an in-phase reflection signal VF1, and the force sensing electrode PE01 is applied with an in-phase reflection signal VF1, where VF1 is in-phase with VF and the amplitude of VF1 is the same as that of VF. In other embodiments, the amplitude of VF1 is different from that of VF.

Figure 11:
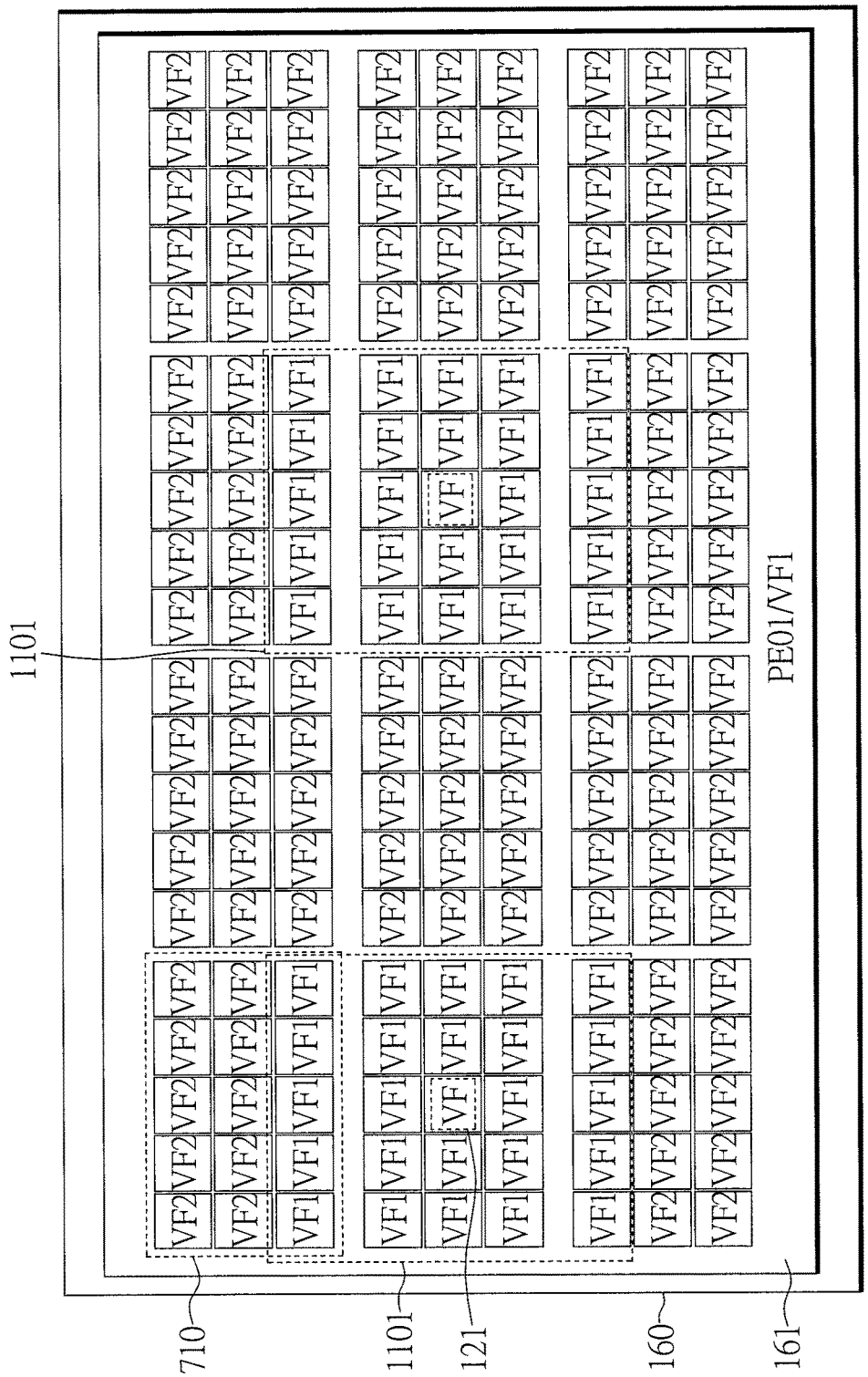
FIG. 11 is another schematic diagram illustrating a fingerprint identification being performed according to the present invention.

FIG. 11 is another schematic diagram illustrating a fingerprint identification being performed according to the present invention. As shown in FIG. 11, when the fingerprint identification is performed, the first electrodes 121 alone can be used to perform related capacitance detection. When the first electrode 121 alone is used to perform the capacitance detection, the first electrode 121 is applied with a capacitance detection stimulation signal VF, and the first electrodes 121 surrounding said first electrode 121 within two circles are applied with an in-phase reflection signal VF1. As shown in FIG. 11, for the first electrodes 121 in dashed boxes 1101, in addition to applying a capacitance detection stimulation signal VF to the first electrode 121, an in-phase reflection signal VF1 is applied to the remaining first electrodes. The first electrodes 121 outside the dashed boxes 1101 receive a capacitance stimulation counter signal VF2. The force sensing electrode PE01 receives an in-phase reflection signal VF1. VF1 is in-phase with VF, and the amplitude of VF1 is the same as that of VF. The capacitance stimulation counter signal VF2 is out of phase to VF, and the amplitude of VF2 is the same as that of VF. In other embodiments, the amplitude of VF1 or VF2 can be different from that of VF. Alternatively, VF2 can be a specific DC voltage level, such as zero voltage level.

Figure 12B:
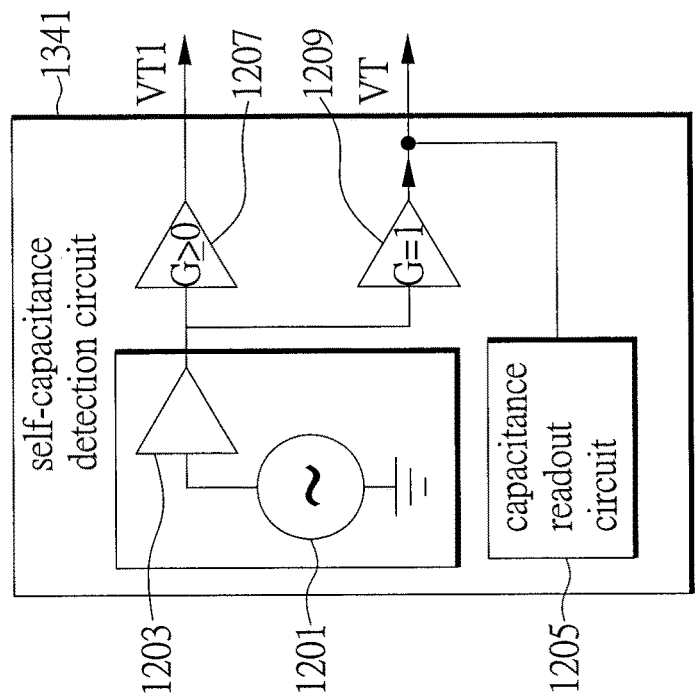
FIG. 12B is another schematic diagram of the self-capacitance detection circuit according to the present invention.
Figure 12A:
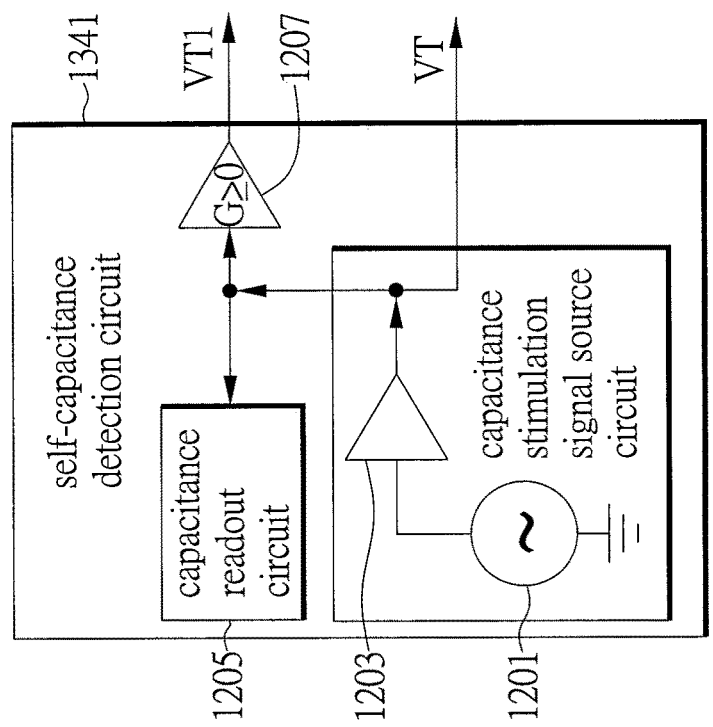
FIG. 12A is a schematic diagram of a self-capacitance detection circuit according to the present invention.

FIG. 12A is a schematic diagram of the self-capacitance detection circuit according to the present invention, which is used in the touch sensing operation of FIG. 8. As shown in FIG. 12A, the self-capacitance detection 1341 includes a capacitance stimulation signal source circuit 1201, a first amplifier 1203, a capacitance readout circuit 1205, and a second amplifier 1207. The second amplifier 1207 has a gain greater than or equal to zero, and preferably the gain is equal to 1, so as to generate the in-phase reflection signal VT1 that is in phase with the capacitance stimulation signal VT based on the capacitance stimulation signal VT. Due to being a self-capacitance detection, after the capacitance stimulation signal VT is applied to an electrode, the capacitance readout circuit 1205 reads a voltage of the electrode to calculate the capacitance variation. FIG. 12B is another circuit diagram of the self-capacitance circuit, which is similar to FIG. 12A except that a third amplifier 1209 with a gain greater than 1 is added.

Figure 13B:
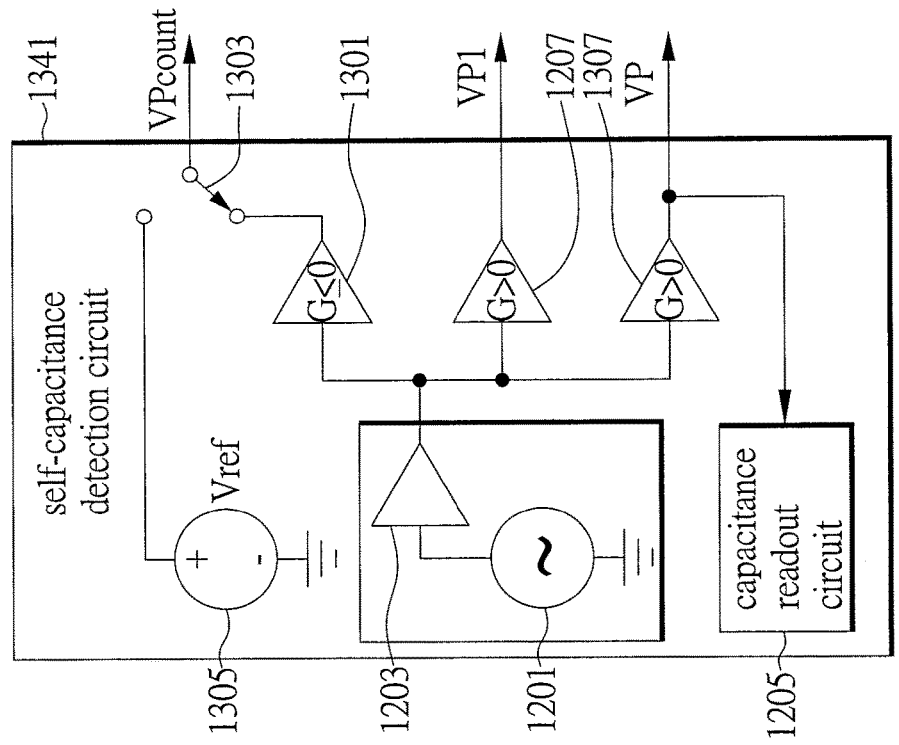
FIG. 13B is yet another schematic diagram of the self-capacitance detection circuit according to the present invention.
Figure 13A:
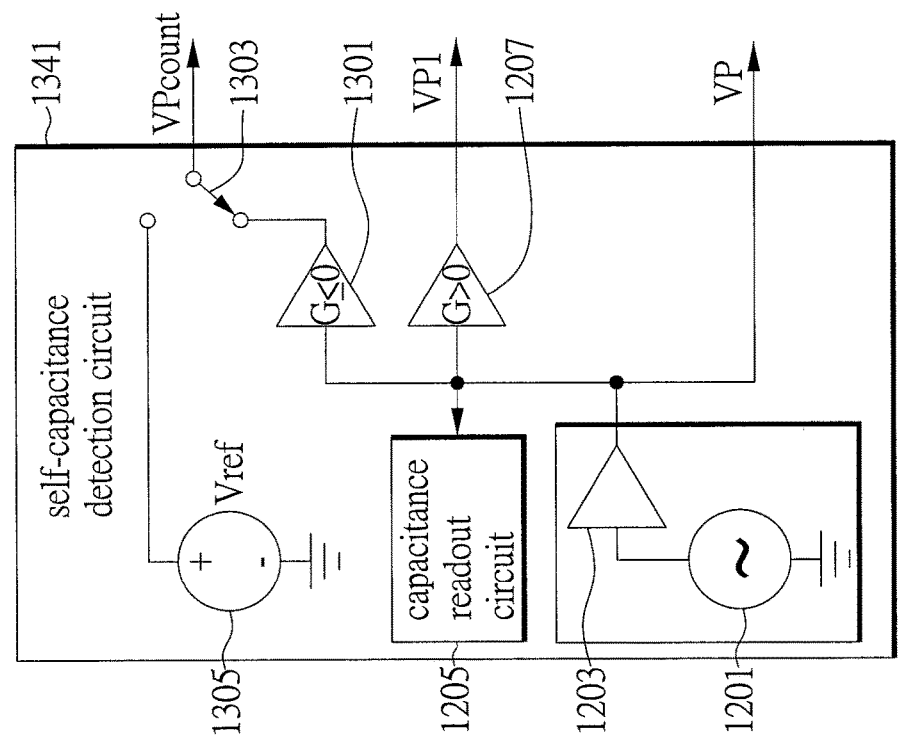
FIG. 13A is still another schematic diagram of the self-capacitance detection circuit according to the present invention.

FIG. 13A is still another schematic diagram of the self-capacitance detection circuit according to the present invention. As shown in FIG. 13A, the self-capacitance detection circuit 1341 includes a capacitance stimulation signal source circuit 1201, a first amplifier 1203, a capacitance readout circuit 1205, a second amplifier 1207, a third amplifier 1301, a switch 1303, and a reference voltage generating device 1305. The second amplifier 1207 has a gain greater than zero, and preferably the gain is equal to 1. The third amplifier 1301 has a gain smaller than or equal to zero, so as to respectively generate the in-phase reflection signal VP1 in phase with the capacitance detection stimulation signal VP and the capacitance stimulation counter signal VPcount out of phase with the capacitance detection stimulation signal VP according to the capacitance detection stimulation signal VP. The capacitance stimulation counter signal VPcount can be a specific DC reference voltage level, such as a zero voltage level.

Figures 14A, 14B:
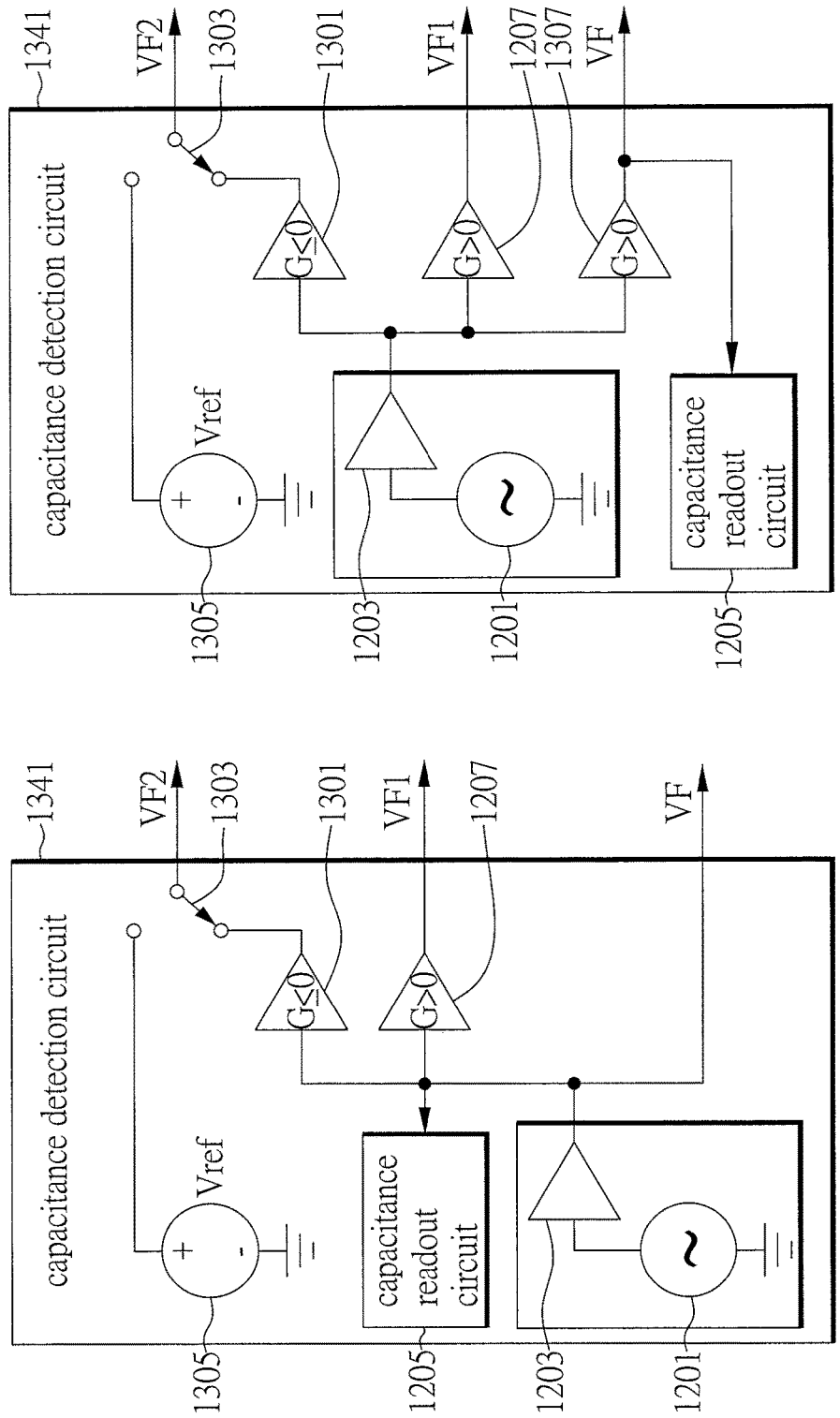
FIG. 14A is further another schematic diagram of the self-capacitance detection circuit according to the invention.
FIG. 14B is still further another schematic diagram of the self-capacitance detection circuit according to the present invention.

FIG. 13B is yet another schematic diagram of the self-capacitance detection circuit according to the present invention, in which a fourth amplifier 1307 with a gain greater than 1 is added into the self-capacitance detection circuit in comparison with the previous embodiment. FIGS. 14A and 14B illustrate the self-capacitance detection circuit according to other embodiments of the present invention, and the circuit diagrams in FIGS. 14A and 14B are similar to FIGS. 13A and 13B, and thus a detailed description therefor is deemed unnecessary.

Figure 15:
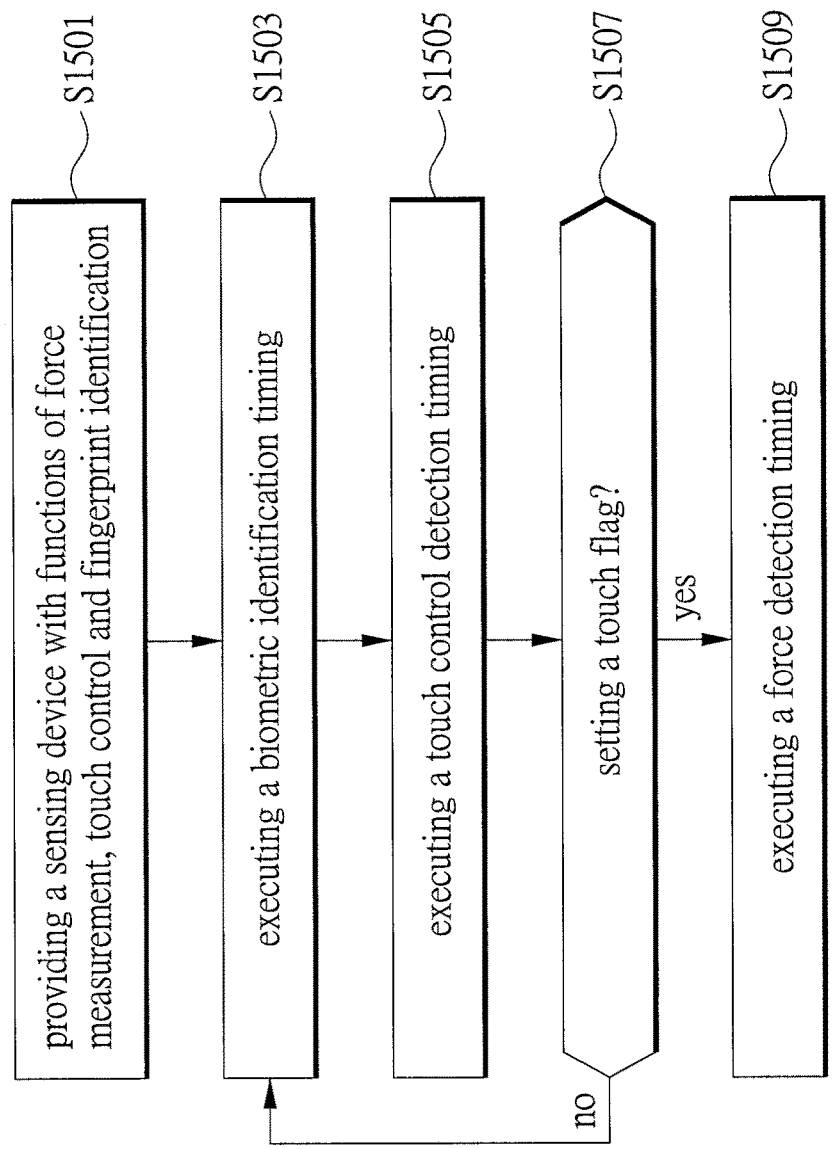
FIG. 15 is a flow chart illustrating a sensing method for the sensing device with functions of force measurement, touch control and fingerprint identification according to the invention.

FIG. 15 is a flow chart illustrating a sensing method for the sensing device with functions of force measurement, touch control and fingerprint identification according to the present invention. Please refer to FIG. 15 as well as FIGS. 1 to 4 showing the structure of the sensing device 100. First, in step S1501, the sensing device 100 with functions of force measurement, touch control and fingerprint identification is provided. The sensing device 100 comprises a sensing electrode substrate 110, a first electrode layer 120, a switch and wire layer 130, a force electrode layer 160, a resilient dielectric layer 150, and a capacitance detection and switch array control circuit 134. The first electrode layer 120 has a plurality of first electrodes 121. The switch and wire layer 130 includes a plurality of switch circuits 131, a plurality of switch control lines 132, and a plurality of sensing signal lines 133. Each switch circuit 131 is corresponding to an adjacent first electrode 121. Each switch control line 132 is electrically connected to at least two switch circuits 131. The force electrode layer 160 includes at least a force sensing electrode 161. The resilient dielectric layer 150 is arranged between the first electrode layer 120 and the force electrode layer 160. The capacitance and switch array control circuit 134 directly or indirectly generates a switch control signal for being applied to a plurality of switch control lines 132, so as to configure that each of the first electrodes 121 is connected to which one of the sensing wires.

In step S1503, a biometric identification timing is executed, in which the capacitance detection and switch array control circuit 134 controls the plurality of switch circuits 131 to sequentially or randomly apply a capacitance detection stimulation signal to a selected first electrode 121, and receives a biometric sensing signal from the selected first electrode 121, so as to execute a biometric identification operation.

In the biometric identification timing, a reflection signal VF1 in phase with the capacitance detection stimulation signal VF is further applied to the first electrodes 121 surrounding the selected first electrode 121.

In step S1505, a touch control detection timing is executed, in which the capacitance detection and switch array control circuit 134 controls the plurality of switch circuits 131 to configure the plurality of first electrodes 121 into a plurality of touch control electrodes 710, and sequentially or randomly applies a capacitance detection stimulation signal to a selected touch control electrode 710, and receives a touch control sensing signal from the selected touch control electrode 710, so as to execute a touch control sensing operation, wherein each touch control electrode 710 includes at least fifty first electrodes 121.

In the touch control detection timing, a reflection signal VT1 in phase with the capacitance detection stimulation signal VT is further applied to the touch control electrodes 710 surrounding the selected touch control electrode 710. In the touch control detection timing, it determines whether there is a touch detected and, if yes, a touch flag is set and a coordinate of the touch flag is recorded; otherwise the touch flag is cleared or reset.

In step S1507, when the touch control timing is finished, it determines whether there is a touch detected and, if yes, the force detection timing is executed. The determination is based on whether the touch flag is set or not and, if not, the biometric identification timing is executed.

In other embodiments, when the touch control timing is finished, it determines whether there is a touch detected and, if yes, the biometric identification timing is executed. The determination is based on whether the touch flag is set or not and, if not, the touch control timing is repeated or the touch control timing is stopped.

In step S1509, a force detection timing is executed, wherein the capacitance detection and switch array control circuit 134 applies a capacitance detection stimulation signal to at least a force electrode 161 and receives a force sensing signal from the force electrode 161, so as to execute the force detection operation.

In the force detection timing, a capacitance stimulation counter signal VPcount is further applied to at least a selected touch control electrode 710. In the force detection timing, a reflection signal VP1 in phase with the capacitance stimulation signal VP is applied to the touch control electrodes 701 exclusive of the selected touch control electrode 710.

The capacitance detection stimulation signal VT, VP or VF is an alternating voltage of sine wave, square wave, triangle wave, or trapezoidal wave, or an alternating current source signal. The capacitance stimulation counter signal VPcount or VF2 is a DC reference voltage level or an alternating signal out of phase with the capacitance detection stimulation signal VT VP or VF.

In view of the foregoing, it is known that, when the fingerprint identification is executed, the plurality of first electrodes 121 alone can be used to detect the capacitance variation caused by the fingerprint by using the plurality of switch circuits 131, the plurality of switch control lines 132, the plurality of sensing signal lines 133, the capacitance detection and switch array control circuit 134, and the switch control signal generating circuit 135. Furthermore, a part of the first electrodes 121 can be electrically connected together to form a larger touch control electrode 710 for executing the touch sensing operation by using the plurality of switch circuits 131, the plurality of switch control lines 132, the plurality of sensing signal lines 133, the capacitance detection and switch array control circuit 134, and the switch control signal generating circuit 135. In addition, the force can be calculated by measuring the capacitance variation between the force sensing electrode PE01 and the touch electrode TE22.

In the present invention, when the capacitance detection stimulation signal is applied to an electrode, the reflection signal in phase with the capacitance detection stimulation signal is applied to the electrodes surrounding to the selected electrode, so as to remove the parasitic capacitance between the selected electrode and the electrodes surrounding the selected electrode, and the electric flux lines of the electrode can be clustered and extended, so as to improve the sensitivity of touch sensing, sensing distance, signal to noise ratio, and stability and accuracy of the sensing signal.

Although the present invention has been explained in relation to its preferred embodiment, it is to be understood that many other possible modifications and variations can be made without departing from the spirit and scope of the invention as hereinafter claimed.

What is claimed is:

1. A sensing method for a sensing device with functions of force measurement, touch control and fingerprint identification, the sensing device comprising:
    a sensing electrode substrate;
    a first electrode layer including a plurality of first electrodes;
    a switch and wire layer including:
        a plurality of switch circuits, each switch circuit corresponding to an adjacent first electrode;
        a plurality of switch control lines, each switch control line including at least two control wires and being electrically connected to at least two switch circuits; and
        a plurality of sensing signal lines, each sensing signal line including at least a sensing wire and being electrically connected to at least two switch circuits;
    a force electrode layer including at least one force electrode;
    a resilient dielectric layer arranged between the first electrode layer and the force electrode layer; and
    a capacitance detection and switch array control circuit for directly or indirectly generating a switch control signal applied to the plurality of switch control lines, so as to determine which sensing wire is connected to the first electrodes;
    the sensing method comprising the steps of:
    executing a biometric identification timing, in which the capacitance detection and switch array control circuit controls the plurality of switch circuits to sequentially or randomly apply a capacitance detection stimulation signal to a selected first electrode, and receives a biometric sensing signal from the selected first electrode, so as to execute a biometric identification operation;
    executing a touch control detection timing, in which the capacitance detection and switch array control circuit controls the plurality of switch circuits to configure the plurality of first electrodes into a plurality of touch control electrodes, and sequentially or randomly applies a capacitance detection stimulation signal to a selected touch control electrode, and receives a touch control sensing signal from the selected touch control electrode, so as to execute a touch control sensing operation, wherein each of the touch control electrodes includes at least fifty first electrodes; and
    executing a force detection timing, in which the capacitance detection and switch array control circuit applies a capacitance detection stimulation signal to at least one of the force electrodes, and receives a force sensing signal from the force electrode, so as to execute a force detection operation.

2. The sensing method as claimed in claim 1, wherein the capacitance detection stimulation signal is an alternating voltage of sine wave, square wave, triangle wave or trapezoidal wave, or an alternating current source signal.

3. The sensing method as claimed in claim 1, wherein, in the biometric identification timing, a reflection signal in-phase with the capacitance detection stimulation signal is further applied to the first electrodes surrounding the selected first electrode.

4. The sensing method as claimed in claim 1, wherein, in the touch control detection timing, a reflection signal in phase with the capacitance detection stimulation signal is further applied to the touch control electrodes surrounding the selected touch control electrode.

5. The sensing method as claimed in claim 1, wherein, in the force detection timing, a capacitance stimulation counter signal is further applied to at least a selected touch control electrode.

6. The sensing method as claimed in claim 5, wherein the capacitance stimulation counter signal is a direct reference voltage level or an alternating signal out of phase with the capacitance detection stimulation signal.

7. The sensing method as claimed in claim 5, wherein, in the force detection timing, a reflection signal in phase with the capacitance detection stimulation signal is further applied to the touch control electrodes exclusive of the selected touch control electrode.

8. The sensing method as claimed in claim 1, wherein, when the touch control timing is finished, it further determines whether there is a touch detected and, if yes, executing the force detection timing.

9. The sensing method as claimed in claim 1, wherein, when the touch control timing is finished, it determines whether there is a touch detected and, if yes, executing the biometric identification timing.

10. The sensing method as claimed in claim 1, wherein, in the touch control timing, it determines whether there is a touch detected and, if yes, setting a touch flag and recording a coordinate of the touch flag, otherwise clearing or resetting the touch flag.

11. The sensing method as claimed in claim 10, wherein it determines whether to execute the force detection timing according to whether the touch flag is set or not.

12. The sensing method as claimed in claim 10, wherein it determines whether to execute the biometric identification timing according to whether the touch flag is set or not.

13. A sensing device with functions of force measurement, touch control and fingerprint identification, comprising:
    a sensing electrode substrate;
    a first electrode layer arranged at one side of the sensing electrode substrate and including a plurality of first electrodes arranged along a first direction and a second direction, wherein the first direction is perpendicular to the second direction;
    a switch and wire layer including:
        a plurality of switch circuits, each switch circuit including at least three switches, each switch circuit corresponding to an adjacent first electrode and having a contact electrically connected to the corresponding first electrode;
        a plurality of switch control lines, each switch control line including at least two control wires and being electrically connected to at least two switch circuits; and
        a plurality of sensing signal lines, each sensing signal line including at least a sensing wire and being electrically connected to at least two switch circuits;

a force electrode layer arranged at one side of the first electrode layer opposite to the sensing electrode substrate, and including at least one force electrode; and a resilient dielectric layer arranged between the first electrode layer and the force electrode layer, wherein the resilient dielectric layer is deformed when a force is applied thereto, and is restored to its original volume and shape when the force is removed therefrom.

14. The sensing device with functions of force measurement, touch control and fingerprint identification as claimed in claim 13, further comprising a second electrode layer arranged between the switch and wire layer and the resilient dielectric layer, the second electrode layer including a plurality of second electrodes, each second electrode being corresponding to and electrically connected to one of the plurality of first electrodes.

15. The sensing device with functions of force measurement, touch control and fingerprint identification as claimed in claim 13, wherein each of the switch control lines controls the switch circuits connected thereto for determining that each of the corresponding first electrodes is connected to which one of the sensing wires.

16. The sensing device with functions of force measurement, touch control and fingerprint identification as claimed in claim 13, further comprising a capacitance detection and switch array control circuit for directly or indirectly generating a switch control signal for being applied to the plurality of switch control lines so as to configure that each of the first electrodes is connected to which one of the sensing wires thereby generating a capacitance detection stimulation signal, an in-phase reflection signal and a capacitance stimulation counter signal for being respectively applied to the sensing wires, and receiving a sensing signal from a portion of the sensing wires.

17. The sensing device with functions of force measurement, touch control and fingerprint identification as claimed in claim 16, wherein the capacitance detection and switch array control circuit further includes at least a self-capacitance detection circuit.

18. The sensing device with functions of force measurement, touch control and fingerprint identification as claimed in claim 16, wherein the capacitance detection and switch array control circuit generates the switch control signals via a register or a shift register circuit arranged on the sensing electrode substrate.

19. The sensing device with functions of force measurement, touch control and fingerprint identification as claimed in claim 13, wherein the switches of the plurality of switch circuits are TFT (thin-film transistor) circuits or COMS circuits.

20. The sensing device with functions of force measurement, touch control and fingerprint identification as claimed in claim 13, further comprising a substrate arranged at one side of the resilient dielectric layer opposite to the first electrode layer, wherein the substrate is a protection glass or a protection film of a display device.

21. The sensing device with functions of force measurement, touch control and fingerprint identification as claimed in claim 13, wherein the force electrode layer is a shielding protection layer of a display device.

22. The sensing device with functions of force measurement, touch control and fingerprint identification as claimed in claim 13, wherein the first electrodes and the force electrodes are transparent conductive electrodes.

23. The sensing device with functions of force measurement, touch control and fingerprint identification as claimed in claim 13, wherein the first electrodes and the force electrodes are opaque conductive electrodes.

24. The sensing device with functions of force measurement, touch control and fingerprint identification as claimed in claim 13, wherein the sensing electrode substrate is a polymer thin film substrate, a glass substrate, a sapphire substrate or a ceramic substrate.

* * * * *